United States Patent
Hyde (10) Patent No.: US 8,191,921 B2
(45) Date of Patent: Jun. 5, 2012

(54) FOLDING, RE-CONFIGURABLE, EXPANDABLE, MULTI PURPOSE, PORTABLE, UTILITY TRAILER

(75) Inventor: Ryan P Hyde, Lehi, UT (US)

(73) Assignee: RPH Engineering, Lehi, UT (US)

( * ) Notice: Subject to any disclaimer, the term of this patent is extended or adjusted under 35 U.S.C. 154(b) by 89 days.

(21) Appl. No.: 12/455,282

(22) Filed: May 30, 2009

(65) Prior Publication Data

US 2009/0295192 A1 Dec. 3, 2009

Related U.S. Application Data

(60) Provisional application No. 61/130,278, filed on May 30, 2008.

(51) Int. Cl.
*B62B 5/00* (2006.01)
(52) U.S. Cl. ........................ 280/656; 280/652
(58) Field of Classification Search ............. 280/34, 280/42, 638, 639, 655, 656, 655.1
See application file for complete search history.

(56) References Cited

U.S. PATENT DOCUMENTS

| | | | | |
|---|---|---|---|---|
| 3,642,300 A * | 2/1972 | Klopp | ............................ | 280/656 |
| 4,126,324 A * | 11/1978 | Browning | ........................ | 280/42 |
| 4,239,258 A * | 12/1980 | Burris | ............................ | 280/639 |
| 4,397,476 A * | 8/1983 | Bolyard et al. | ................ | 280/656 |
| 4,511,174 A * | 4/1985 | Walker | ........................... | 296/173 |
| 4,746,142 A * | 5/1988 | Davis | ............................ | 280/656 |
| 4,786,073 A * | 11/1988 | Harper | ........................... | 280/656 |
| 4,887,392 A * | 12/1989 | Lense | ............................ | 49/300 |
| 5,340,134 A * | 8/1994 | Dodson | .......................... | 280/37 |
| 5,829,765 A * | 11/1998 | Snider | ............................ | 280/42 |
| 6,354,611 B1 * | 3/2002 | Mihalic et al. | ................. | 280/30 |
| 6,416,101 B1 * | 7/2002 | Bartch | ........................... | 296/22 |
| 6,511,092 B1 * | 1/2003 | Chepa | ........................... | 280/656 |
| 6,845,991 B1 * | 1/2005 | Ritucci et al. | .................. | 280/30 |
| 6,962,370 B2 * | 11/2005 | Simpson | ........................ | 280/789 |
| 7,475,901 B2 * | 1/2009 | Winter et al. | ................. | 280/656 |
| 7,540,528 B2 * | 6/2009 | Spainhower | .................. | 280/656 |
| 7,681,906 B2 * | 3/2010 | Shawyer | ....................... | 280/656 |
| 7,770,913 B2 * | 8/2010 | Cannon | ......................... | 280/656 |
| 7,810,834 B2 * | 10/2010 | Schneider et al. | ............ | 280/656 |
| 2003/0214117 A1 * | 11/2003 | Steins et al. | ................. | 280/656 |
| 2005/0093273 A1 * | 5/2005 | McDonell | ..................... | 280/656 |
| 2009/0066061 A1 * | 3/2009 | Winter et al. | ................. | 280/639 |
| 2009/0224512 A1 * | 9/2009 | Winter et al. | ................. | 280/639 |
| 2009/0309330 A1 * | 12/2009 | Ryan | ............................ | 280/462 |

* cited by examiner

*Primary Examiner* — J. Allen Shriver, II
*Assistant Examiner* — James Triggs

(57) ABSTRACT

A utility trailer, as for example may be towed behind a vehicle, is disclosed. A description of the assembly, reconfiguration, expandability and folding of the trailer is described. The trailer is easy to store, manufacture, reconfigure and disassemble in large measure due to the unique repeated nature of the main frame components. The frame components can also be removed from the trailer assembly and reconfiguring into different useful devices. The reconfiguration requires minimal additional hardware and is further simplified by the locking mechanisms, located at the connection locations of is each frame panel. The trailer/accessory system also offers advantages over other trailers in that it may be maintained by replacement of common panel components. The wheel assemblies are also collapsible to further reduce necessary storage space and shipping requirements.

12 Claims, 12 Drawing Sheets

EXPLODED VIEW

FOLDING, RE-CONFIGURABLE, EXPANDABLE, MULTI PURPOSE, PORTABLE, UTILITY TRAILER

RELATED APPLICATIONS

This application is related to and claims priority from U.S. provisional Patent Application Ser. No. 61/130,278 filed May 30, 2008, for "Folding, Re-configurable, Expandable, Multi Purpose, Portable, Utility Trailer", with inventors Ryan Hyde, which is incorporated herein by reference.

THE FIELD OF THE INVENTION

The present invention relates a utility trailer and the many different configurations, sizes and options available to customers in this industry. More specifically, the present invention relates to the unique mechanical mechanism and subassemblies that make this trailer foldable, expandable and reconfigurable compared to other currently available designs which are non-configurable or are only somewhat collapsible.

THE RELEVANT TECHNOLOGY

Generally a typical utility or service trailer consists of the following subassemblies:
  a. Wheel-hub-spindle assembly
  b. Spindle to axle assembly
  c. Spring or shock absorption assembly attached between the wheel and frame in any manner.
  d. Load carrying frame assembly
  e. Deck assembly (May be included in frame assembly)
  f. Hitch assembly The assemblies mentioned above may be arranged in various configurations in order to carry the applied load during use and to adequately transfer the load to the wheel assemblies during operation.

Typically the deck assembly consists of 1 or 2 deck panels. When more than one deck panel is used, it is typically for the purpose of folding or tilting the deck to create an inclined plane upon which the load can be drawn into carrying position. Some designs have more than one deck panel for the purpose of folding the trailer into a stored or compact position. Generally deck panels are permanently connected and cannot be removed from the trailer system.

A typical wheel-hub-spindle assembly is generally used to carry the load. During operation, the left and right wheel assemblies are normally tied together with an axle or by using the frame as a cross member to resist the twisting moment caused by the load. If the spindles were not fixed together by the axle or frame, the load would cause the outside portion of the spindles to tilt upward as the roadside lower portion of the tires spreads apart.

Accordingly, a need exists for a method of folding the above-mentioned subassemblies into a compact, light-weight configuration for storage while allowing easy configuration to a usable fixed and secure operational condition. A primary obstacle that prevents a compact storage condition is the location of the wheels during the operational condition and the reconfiguration of the wheels to an optimal storage positions. The distance or operational span between the wheels, necessary for stable towing and operation, is in competition to the optimal storage location. Because wheel loading and the proper fixing of axle-hub-wheel systems is key to safe operation of a trailer, most load carrying members are fixed into a permanent position with the wheel spacing wide and permanently fixed. Similarly the need or desire for a large deck area makes tight storage difficult.

BRIEF SUMMARY OF THE INVENTION

The present invention has been developed in response to the present state of the art, and in particular, in response to the problems and needs in the art that have not yet been fully solved by currently available. The invention was developed to improve attributes related to storage, utility, functionality and expandability of currently available products. The invention includes several unique attributes that include but are not limited to the following areas:
  1. Removable deck panels
  2. Configurable/Multipurpose deck panels
  3. Foldable Wheel-Hub-Spindle-Spring assemblies
  4. Segmented Axle assembly
  5. Quick release deck panel mechanism
  6. Quick release mechanism with feedback to eliminate improper engagement
  7. Deck Panels with identical "dimensional" characteristics
  8. Deck Panels with unique "Functional" characteristics The multi-functional elements mentioned above not only create a uniquely equipped trailer but offer added functionality never before associated to a standard utility trailer. Several useful devices found as standard products separately are configured together in this uniquely compact design. These and other features of the present invention will become more fully apparent from the following description, or may be learned by the practice of the invention as set forth hereinafter.

DETAILED DESCRIPTION OF THE PREFERRED EMBODIMENTS

It will be readily understood that the components of the embodiments as generally described and illustrated in the Figures herein could be arranged and designed in a wide variety of different configurations. Thus, the following more detailed description of various embodiments of the present invention, as represented in the Figures, is not intended to limit the scope of the invention, as claimed, but is merely representative of the embodiments of the invention.

The Folding/Re-configurable Multi Purpose Portable Trailer is intended to be a lightweight, easily reconfigurable, multi purpose, compact device. The portable trailer has easily removable and configurable deck panels. The wheel-hub-spindle-spring assemblies are unique in that they are collapsible to a compact configuration for space savings.

The present invention may be embodied in other specific forms without departing from its spirit or essential characteristics. The described embodiments are to be considered in all respects only as illustrative and not restrictive. The scope of the invention is, therefore, indicated by the foregoing illustrative description. All changes that come within the meaning and range of equivalency of the description are to be embraced within their scope.

Figure 1:
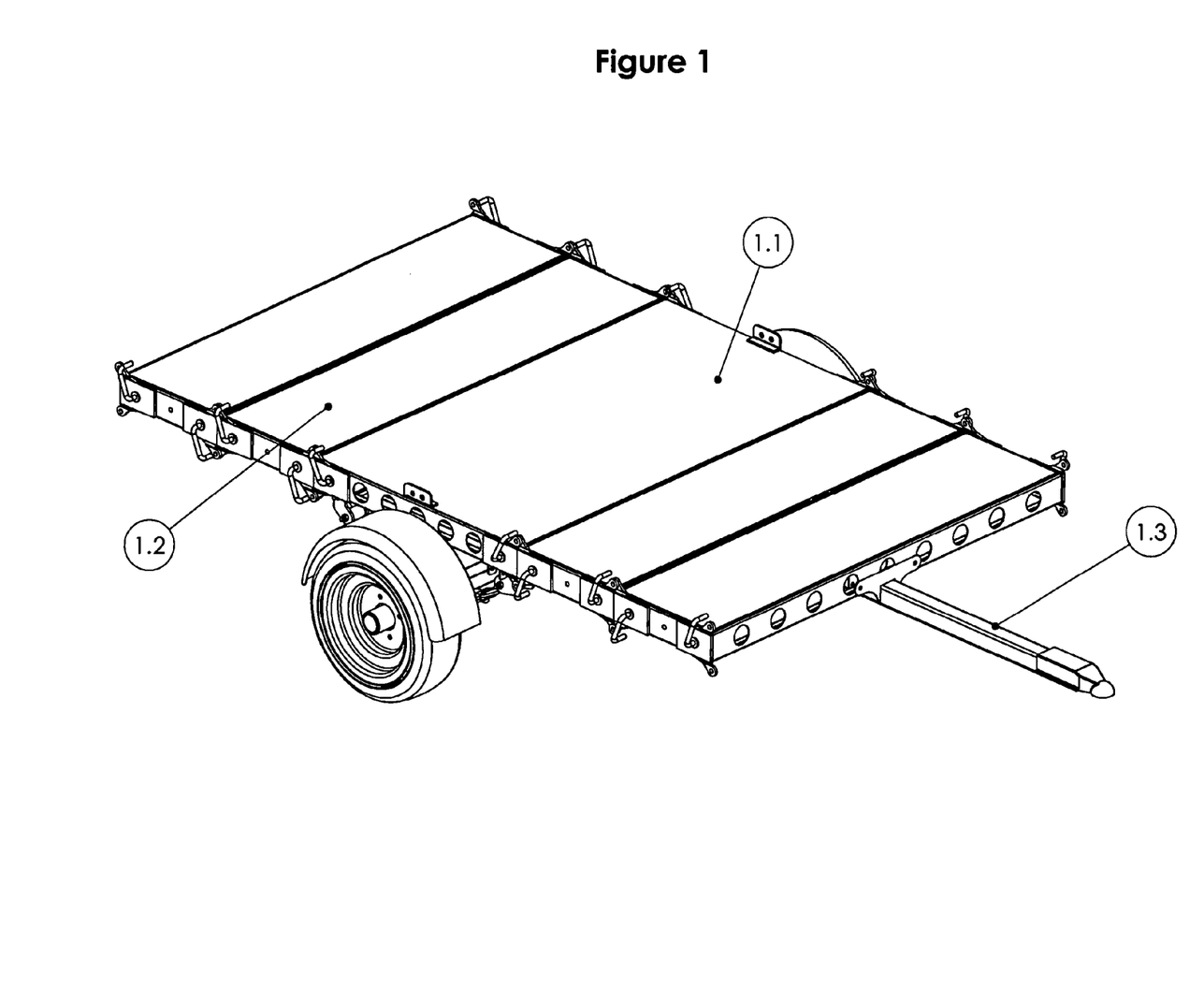
FIG. 1 shows a full view of the trailer in its standard configuration.

FIG. 1 shows a complete trailer system which consists of a center deck assembly 1.1, multiple deck panels 1.2 and a hitch assembly 1.3. The center deck assembly 1.1 also contains the wheel and axle assembly with leaf spring mechanism. These main items make up a usable utility trailer system and will be readily understood by any individual with common knowledge in this industry. The deck panels are shown evenly distributed or attached to the center assembly but this is not a required configuration. It may be preferable to configure the trailer with three panels on the hitch side of the axle and one panel on the rear side of the axle for stability purposes. It may also be advantageous in some instances to use more or less panels than shown in FIG. 1.

Figure 2:
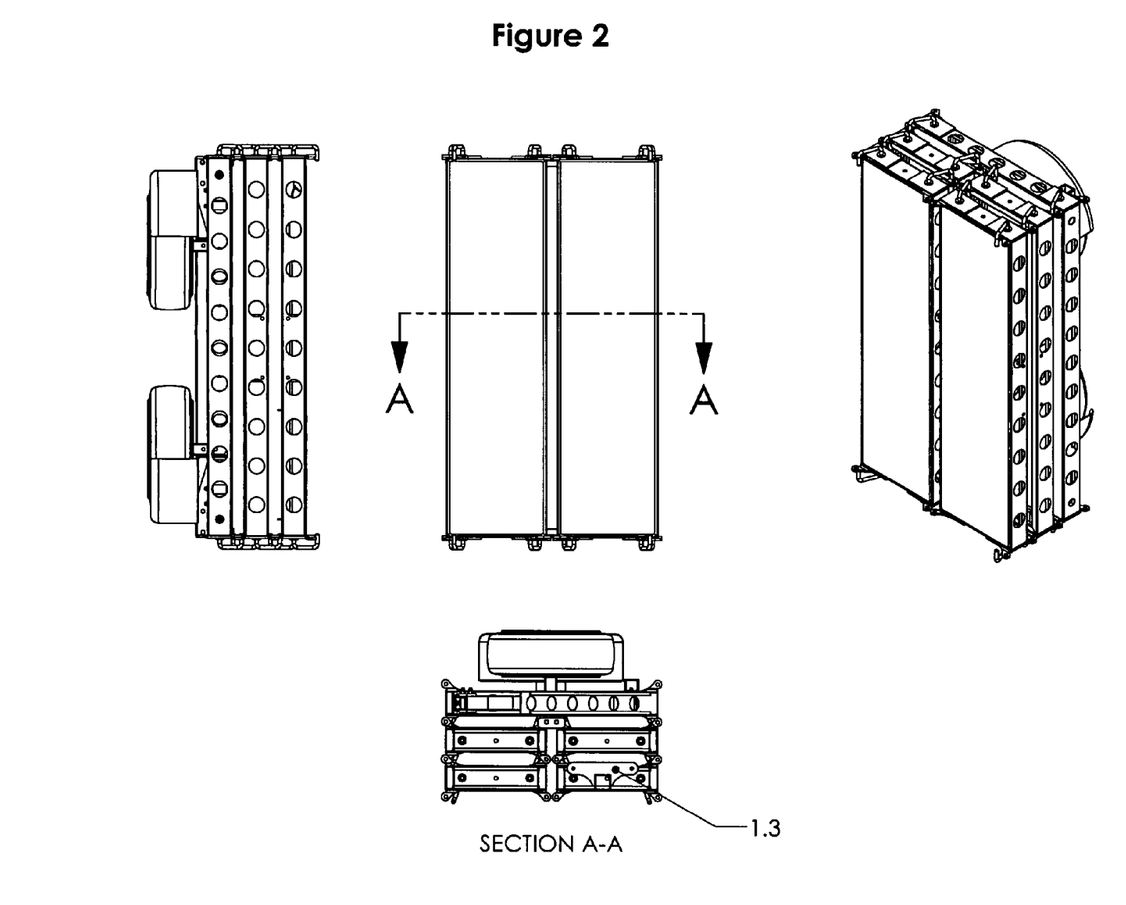
FIG. 2 shows multiple views of the trailer in its folded configuration.

FIG. 2 shows the same components as identified in FIG. 1 in a folded/storable configuration (top, front, right, and isometric views). The hitch assembly, item 1.3, is shown detached and stored in between panels. The wheel axle assembly is shown folded. During the folding process it may be advantageous to fold only the panels and leave the wheels extended as the user maneuvers the assembly into position. The assembly thus becomes a natural dolly during the storage process. When the user reaches the position of storage the wheels can then be folded up for further compact ability.

Figure 3:
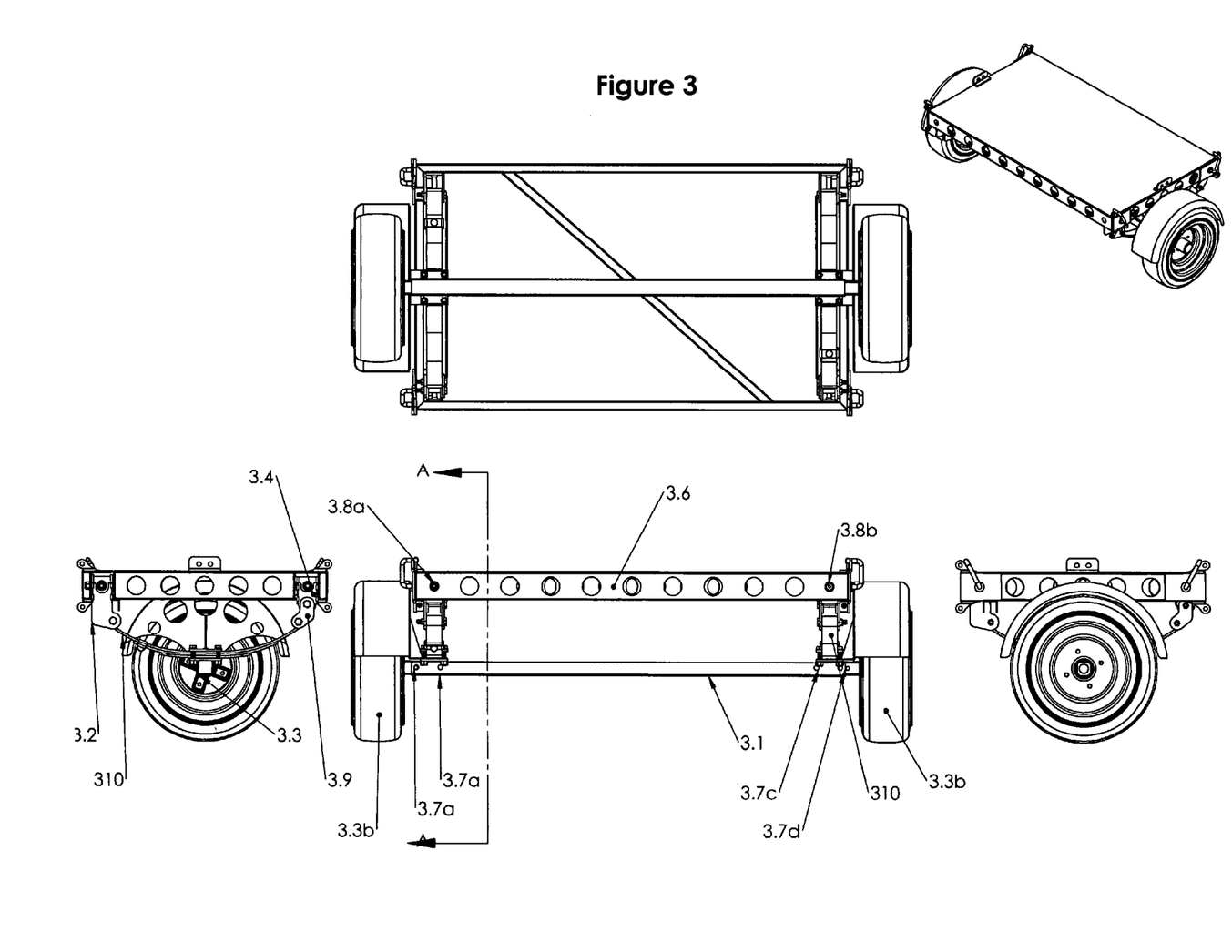
FIG. 3 shows multiple views of the center deck panel of the trailer with the attached foldable wheel assemblies in working position.

FIG. 3 shows multiple views of the center deck panel with attached wheel and axle assembly. Item 3.1 is the removable axle. The axle, item 3.1, is pinned in multiple locations, 3.7a, 3.7b, 3.7c, and 3.7d, to prevent rotation of the wheel assemblies, items 3.3a and 3.3b, and to carry the associated loading. The axle, 3.1, can be easily removed to allow the wheel assemblies, item 3.3a and 3.3b, to pivot around the axis of points 3.8a and 3.8b. Item 3.2 shows a bracket assembly which connects the leaf spring to the main center deck panel, 3.6, and allows the wheels to pivot around the axis of points 3.8a and 3.8b. Another bracket, item 3.4, is similar to item 3.2 in that it rotates around points 3.8a and 3.8b, but it is not directly connected to the leaf spring, item 3.10. Item 3.4 is connected to the leaf spring, item 3.10, thru a standard trailer shackle, item 3.9.

Figure 4:
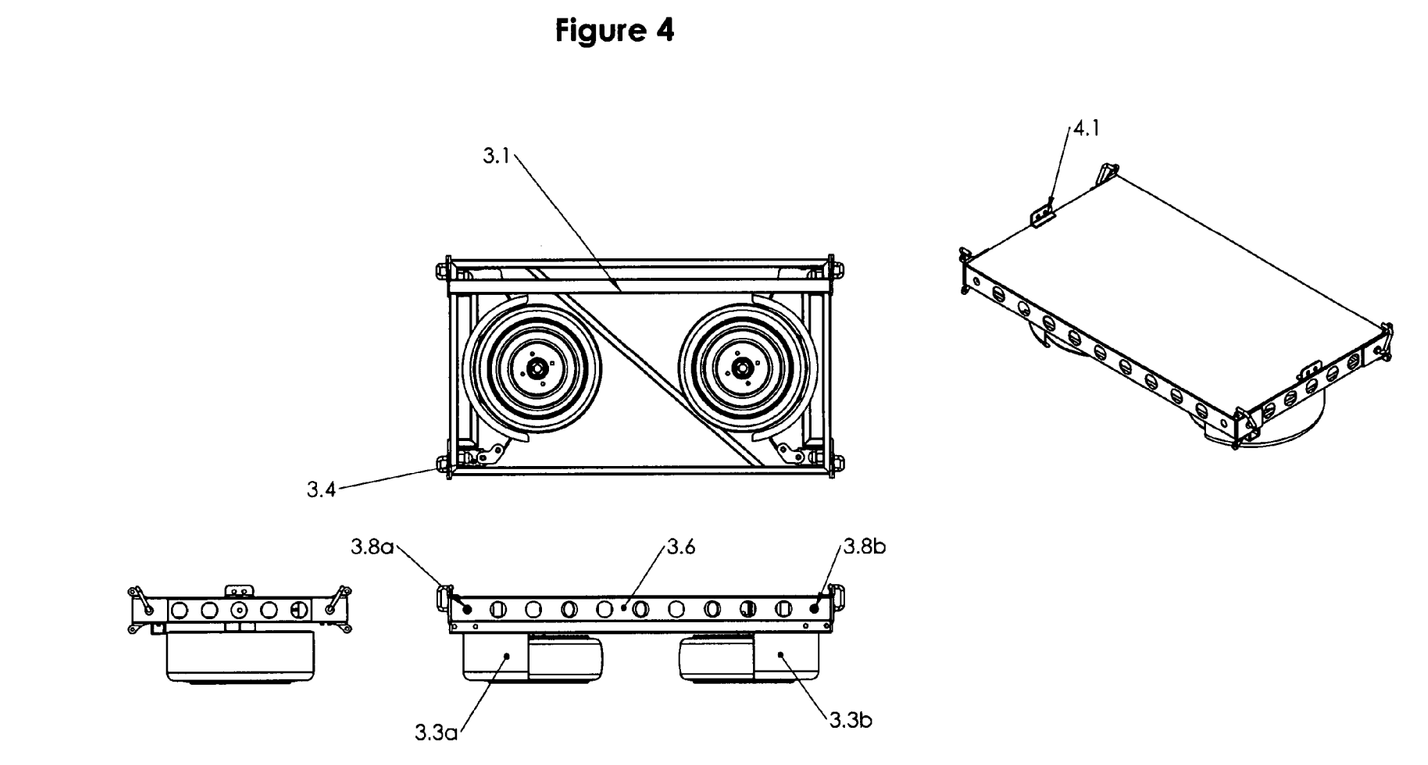
FIG. 4 shows the multiple views of the center deck panel of the trailer with the attached wheel assemblies in folded position.

FIG. 4 shows multiple views of the center deck panel, item 3.6, with attached wheel and axle assemblies 3.3a and 3.3b in a folded configuration. The wheel assemblies, items 3.3a and 3.3b, have rotated around points 3.8a and 3.8b. After rotation into the storage location, approximately 90 degrees, the axle, item 3.1 is then reattached to the main deck panel, item 3.6, in such a manner as to lock the wheel assemblies, items 3.3a and 3.3b, into a closed, compact position. Item 4.1 is a tab used to lock the deck panels in position when configured as shown in FIG. 2 using a locking pin item 11.1. The center deck assembly as described in FIG. 3 and FIG. 4 is designed such that compact storage can be achieved yet the loads required during operation on the axle, item 3.1, the wheel assemblies, items 3.3a and 3.3b, and the deck, item 3.6, can be withstood. The hardware required to transfer the load from the wheel assemblies, items 3.2 and 3.4, are appropriately sized to withstand the loading.

Figure 5:
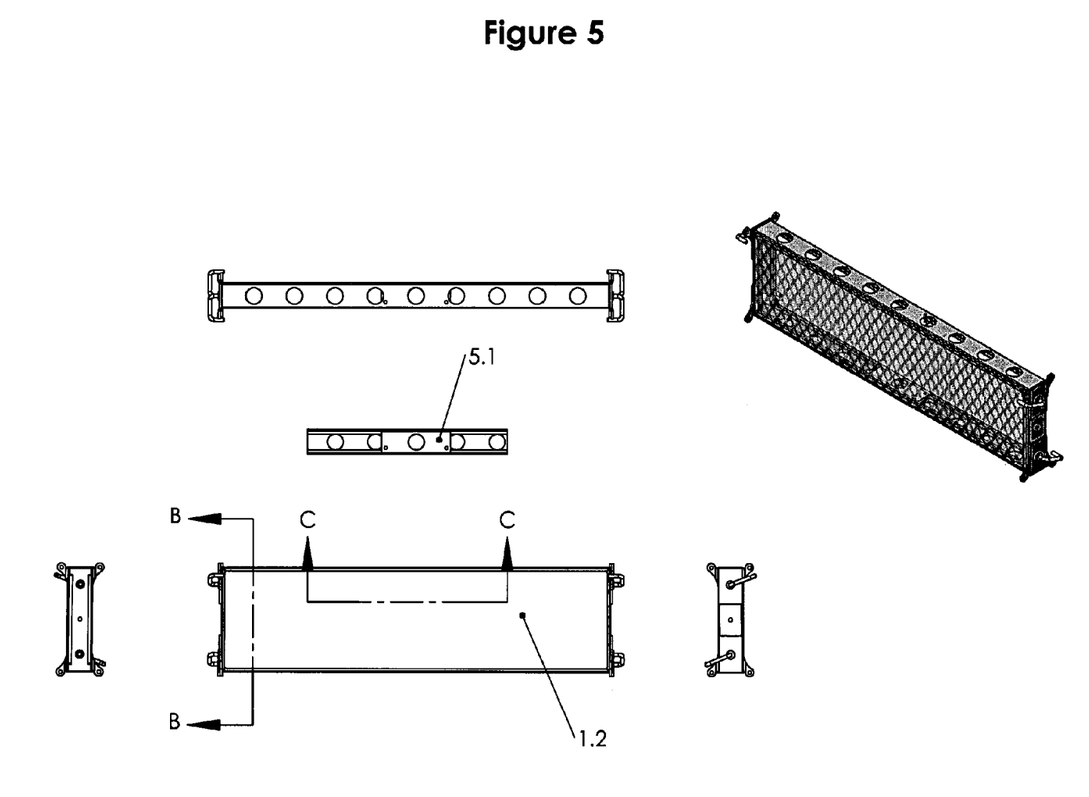
FIG. 5 shows a deck panel of the trailer.

FIG. 5 shows multiple views of a standard deck panel item 1.2. The deck panel has locking mechanism at each corner to allow quick attachment to the center deck panel or to another deck panel. The locking mechanism will be further described in FIG. 11. The mechanism to prevent axial movement of panels will be described in FIG. 12. The side panels and the center deck panel all contain a pivoting metal plate, item 11.2. The plates, item 11.2 on each corner are not identical but are mirrored (left and right) such that panels can be joined together. When a panel is placed into position to be connected with an adjoining panel it may need to be rotated 180 degrees so that the corners of each adjoining panels are aligned properly for connection. Item 5.1 is a gusset used to attach the hitch, item 1.3, when the unit is in its extended configuration.

Figure 6:
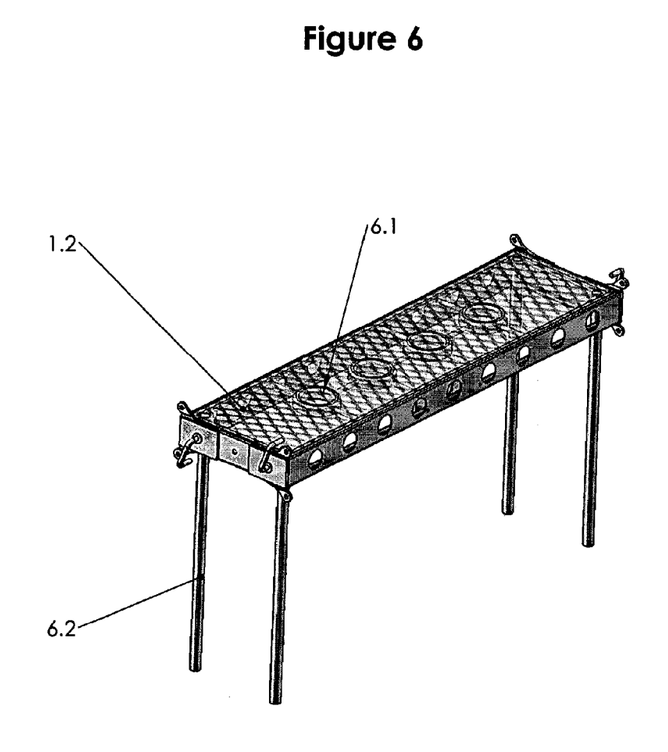
FIG. 6 shows a deck panel configured as a stove.

FIG. 6 shows a deck panel, item 1.2, configured as a stove. The gas burners, item 6.1 are a permanent assembly inside of the panel. This configuration shows an expanded metal top. Removable legs, items 6.2 are removed from the storage location inside the panel and attached as legs. All necessary components for a working stove can be included inside the deck panel. The deck panel can also be used as a utility trailer deck panel when not configured as a stove.

Figure 7:
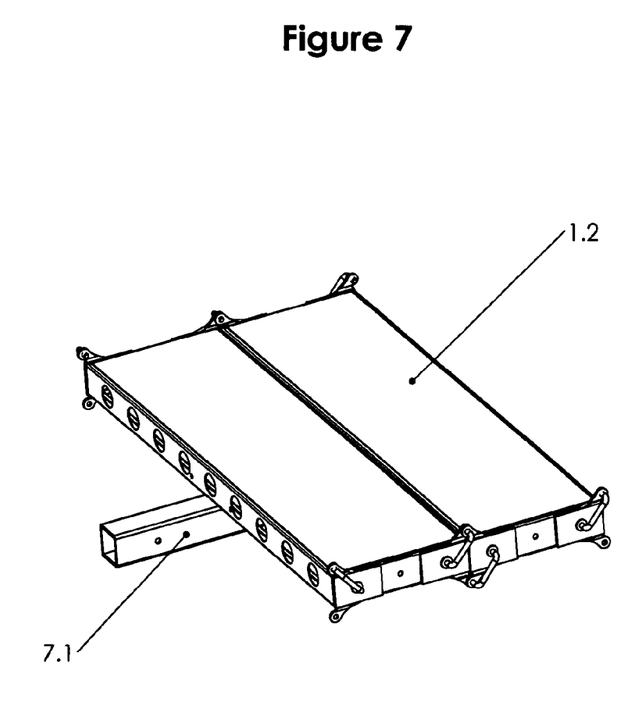
FIG. 7 shows multiple deck panels configured as a cargo platform.

FIG. 7 shows two deck panels, items 1.2, configured as a cargo platform. Item 7.1 is a standard rectangular steel tube that fits in a standard receiver hitch and is pinned for operation. This configuration shows only two panels but more panels may be used if desired. The standard locking mechanisms used to connect panels when configured as a utility trailer are used to connect the panels for use as a cargo platform. The inner gussets, item 5.1, contained in each standard deck panel allow for a common attachment point to connect the receiver hitch, item 7.1, to the deck panel, item 1.2.

Figure 8:
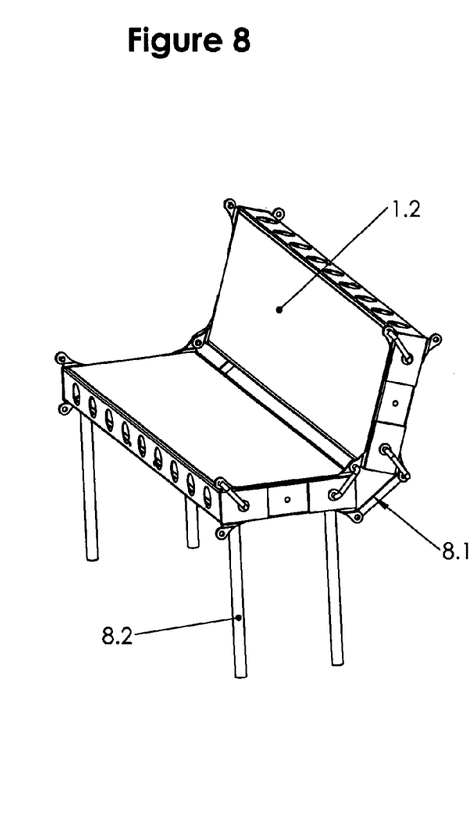
FIG. 8 shows multiple deck panels configured as a bench or chair.

FIG. 8 shows two deck panels, items 1.2, configured as a stool or bench.

Hardware, item 8.1 and 8.2, can be used to configure the panels. The standard locking mechanisms used to connect panels when configured as a utility trailer are used to connect the panels for use as a cargo platform.

Figure 9:
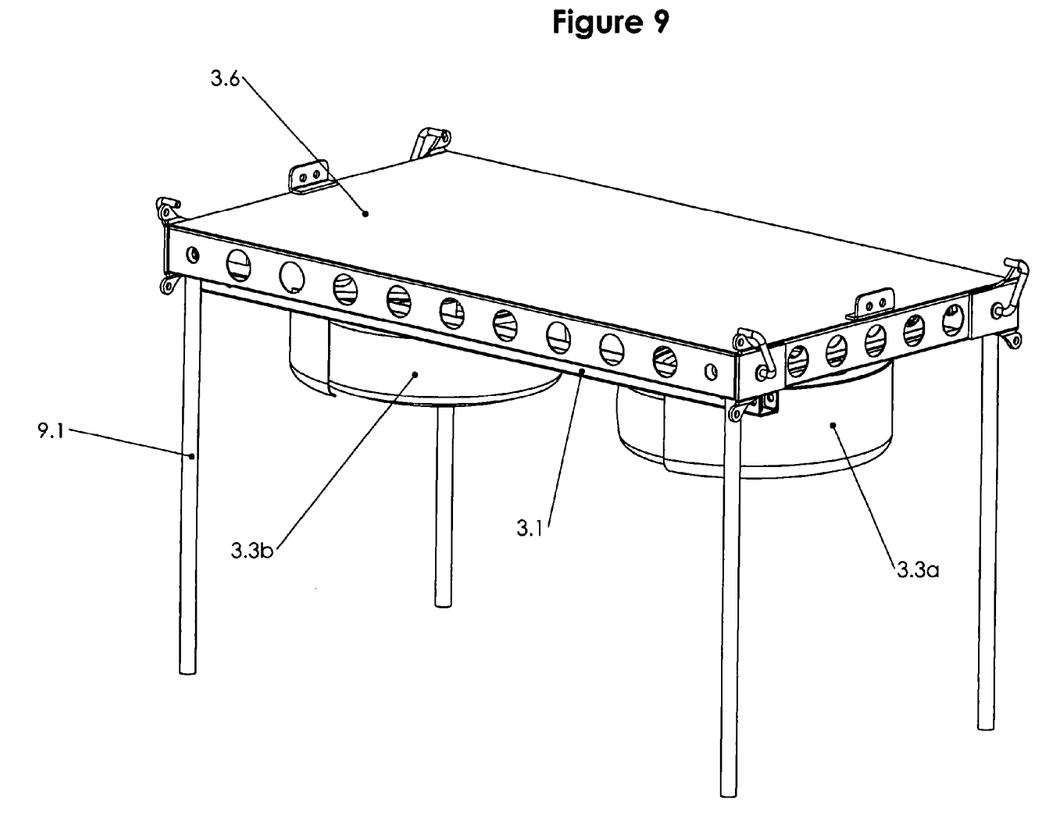
FIG. 9 shows the center deck panel configured as a table.

FIG. 9 shows the center deck panel, item 3.6, configured as a table. Both items 3.3a and 3.3b are rotated up and locked into place using item 3.1. Four legs, items 9.1 are then attached and locked into position.

Figure 10:
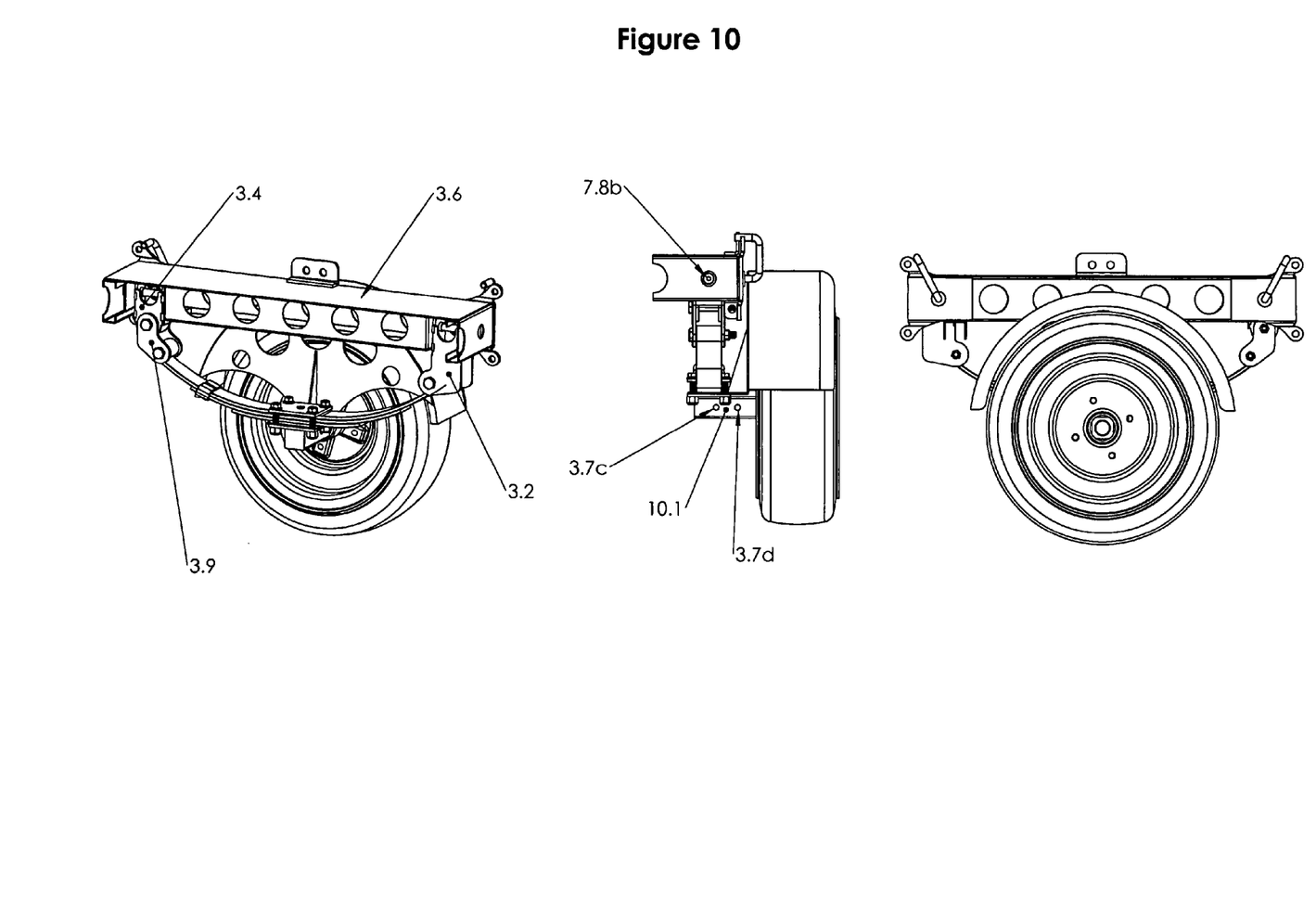
FIG. 10 shows multiple views of a section of the center deck/wheel pivot assembly.

FIG. 10 is a multi-section view of the center deck/wheel assembly. It is provided to more clearly show the components that provide rotation and the load carrying members identified in FIG. 3 and FIG. 4. Item 10.1 is the wheel spindle. A plate is welded to the spindle and attachment bolts are then used to connect the spindle to the leaf spring. The Axle, item 10.1, is double pinned at two points, 3.7c and 3.7d, on each spindle to carry the moment load at each wheel thru the axle item 3.1.

Figure 11:
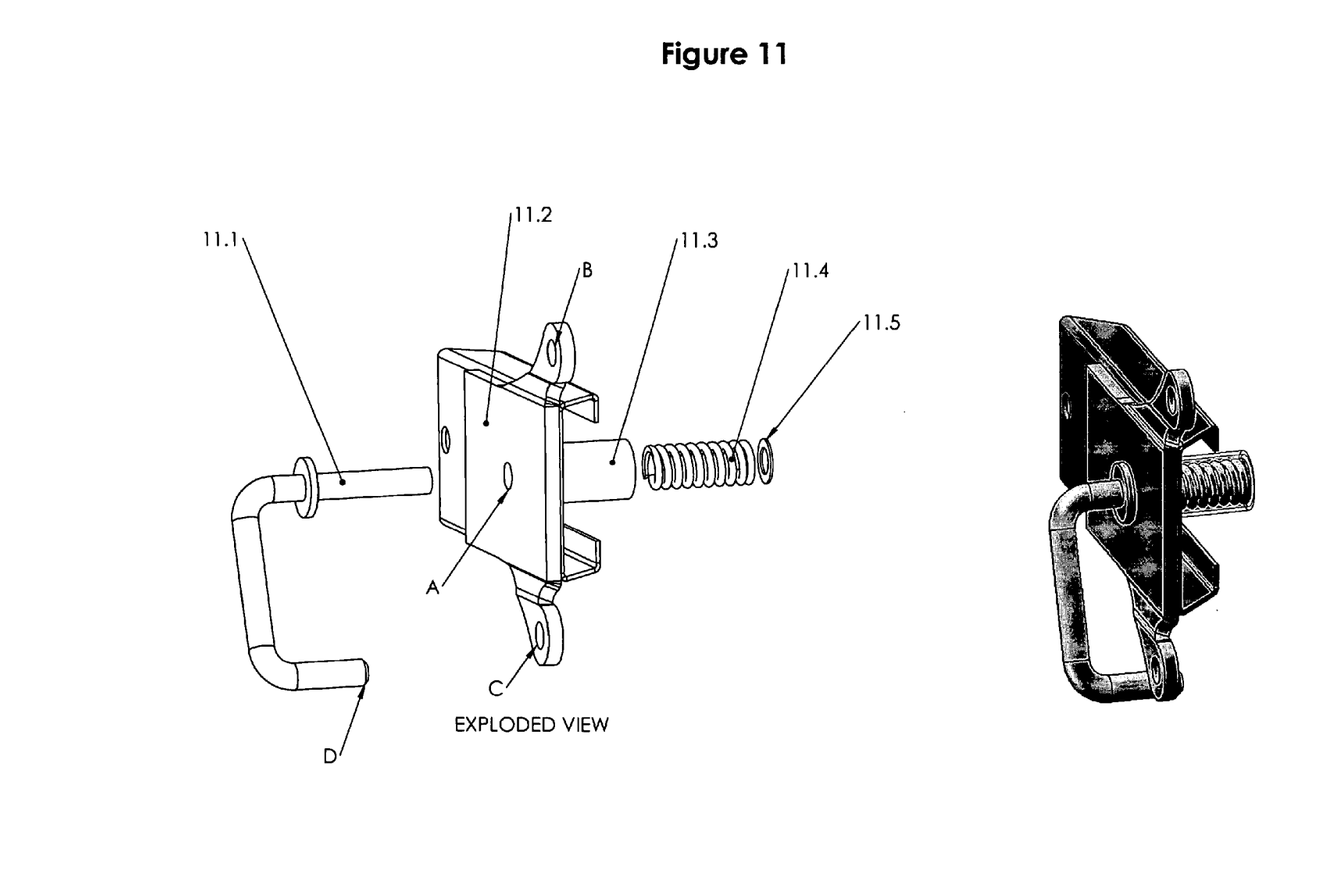
FIG. 11 shows a spring loaded locking mechanism.

FIG. 11 shows an exploded and collapsed view of the locking mechanism at each corner of the center deck assembly and the standard deck panels, items 3.6 and 1.2. When assembled, the pivot rod, item 11.1, is spring loaded. The main shaft of 11.1 is placed thru hole A. The spring, item 11.4, is loaded inside of the pocket created by item 11.3 and a washer, item 11.5, is used to compress the spring, item 11.4. When the spring is compressed the washer is then welded to the end of item 11.1. Assembling the components in this manner creates a continuous load on the spring and makes it necessary to exert force to remove item 11.1 from hole A. In this condition, end D of 11.1 can then be rotated and used as a locking pin in hold C or B as desired and prevents unintentional removal from hole C or D. As an added safety measure, end D of item 11.1 may be colored red to indicate it is not engaged. When engaged the red color is not visible thus indicating proper engagement.

Figure 12:
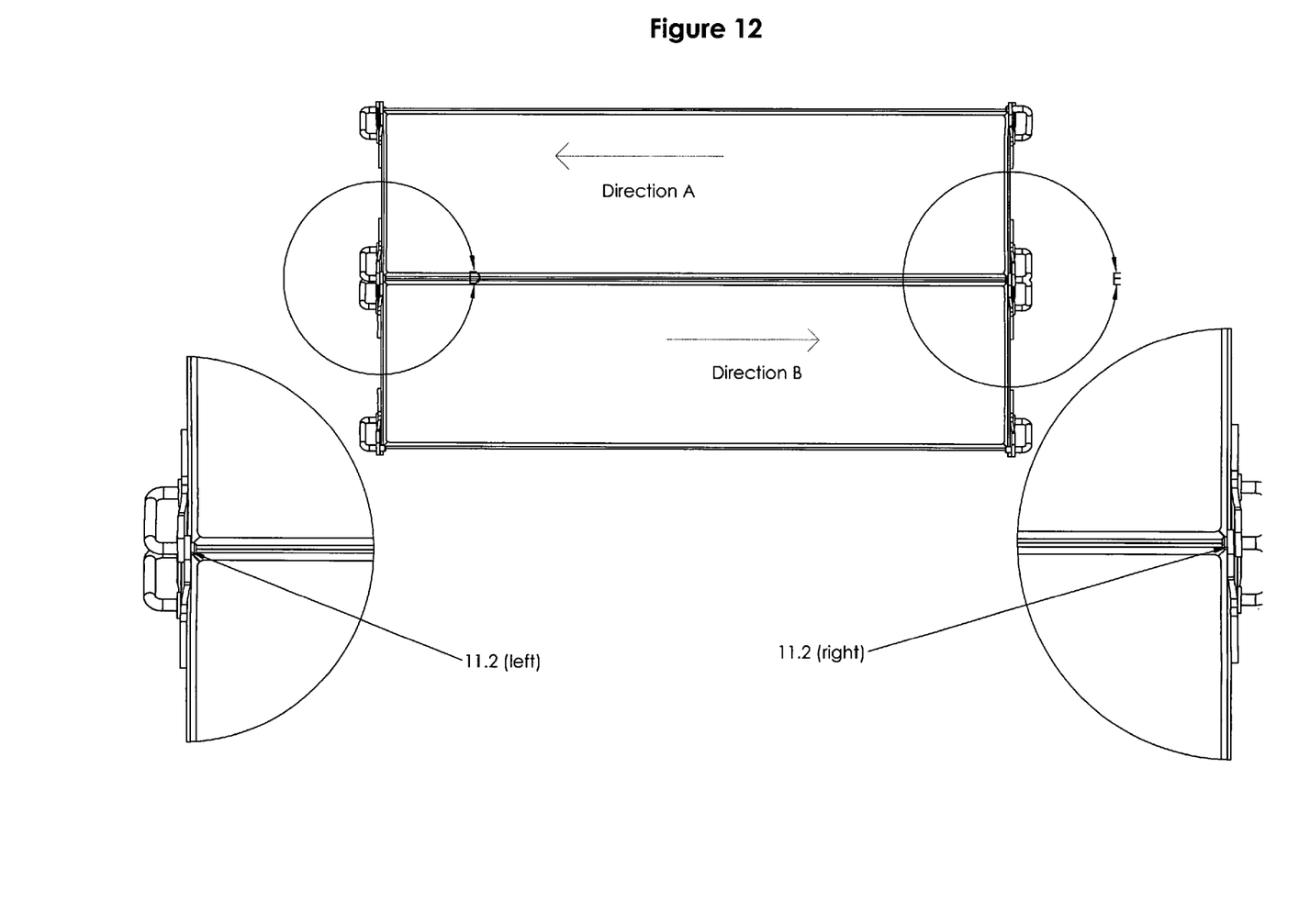
FIG. 12 shows two panels unable to move due to non symmetric hinge plates.

FIG. 12 shows the pattern of pivot plates (item 11.2 left and 11.2 right) used to lock the panels together and prevent relative axial movement, direction A top panel, direction B bottom panel, when pinned together. Since mirrored parts, normally referred to in industry as a right and left hand parts, are used on each corner of the panel, the panels are prevented from moving opposite each other. This prevents improper over loading on the spring detailed in FIG. 11 and adds an additional safety measure to prevent axial movement between panels in the event a locking pin, item 11.1 is not sufficiently engaged.

What is claimed is:

1. A trailer system, comprising:
    a center deck assembly comprising a center deck panel, a first wheel assembly, a second wheel assembly, and an axle;
    multiple side deck panels;
    a hitch assembly; and
    a rectangular steel tube that fits in a receiver hitch;
    wherein in a first configuration the axle is pinned in multiple locations to prevent lateral rotation of the first wheel assembly and the second wheel assembly;
    wherein removal of the axle permits the first wheel assembly and the second wheel assembly to rotate laterally from the first configuration into a folded configuration;
    wherein the axle is attached to the center deck panel in order to lock the first wheel assembly and the second wheel assembly in the folded configuration;
    wherein each side deck panel is attached to the center deck panel or to another side deck panel via a locking mechanism;
    wherein at least two side deck panels of the multiple side deck panels are configured as a cargo platform;
    wherein each side deck panel of the at least two side deck panels comprises a gusset, so that the at least two side deck panels collectively comprise multiple gussets;
    wherein the gussets on the at least two side deck panels facilitate attachment of the at least two side deck panels to the rectangular steel tube when the at least two side deck panels are configured as the cargo platform; and
    wherein the locking mechanism is used to connect the at least two side deck panels for use as the cargo platform.

2. The trailer system of claim 1, wherein the locking mechanism is located at each corner of the center deck assembly and at each corner of each side deck panel of the multiple side deck panels.

3. The trailer system of claim 1, wherein:
    the center deck panel and each side deck panel of the multiple side deck panels comprise a pivot plate, such that the trailer system comprises multiple pivot plates; and
    the pivot plates are not identical, but are mirrored so that panels can be joined together.

4. The trailer system of claim 3, wherein:
    the pivot plates are used to lock the panels together; and
    the pivot plates prevent relative axial movement of the panels when the pivot plates are pinned together.

5. The trailer system of claim 1, wherein at least one side deck panel of the multiple side deck panels is configured as a stove.

6. The trailer system of claim 5, wherein:
    gas burners are a permanent assembly inside of the at least one side deck panel;
    a storage location within the at least one side deck panel comprises legs; and
    the legs can be removed from the storage location and attached to the at least one side deck panel when the at least one side deck panel is configured as the stove.

7. The trailer system of claim 1, wherein at least two side deck panels of the multiple side deck panels are configured as a stool or bench.

8. A trailer system, comprising:
    a center deck assembly comprising a center deck panel, a first wheel assembly, a second wheel assembly, and an axle;
    multiple side deck panels; and
    a hitch assembly;
    wherein in a first configuration the axle is pinned in multiple locations to prevent lateral rotation of the first wheel assembly and the second wheel assembly;
    wherein removal of the axle permits the first wheel assembly and the second wheel assembly to rotate laterally from the first configuration into a folded configuration;
    wherein the axle is attached to the center deck panel in order to lock the first wheel assembly and the second wheel assembly in the folded configuration;
    wherein each side deck panel is attached to the center deck panel or to another side deck panel via a locking mechanism;
    wherein the center deck panel is configured as a table; and
    wherein when the center deck panel is configured as the table:
    the first wheel assembly and the second wheel assembly are rotated up and locked into place using the axle; and
    legs are attached to the center deck panel and locked into position.

9. A trailer system, comprising:
    a center deck assembly comprising a center deck panel, a first wheel assembly, a second wheel assembly, and an axle;
    multiple side deck panels; and
    a hitch assembly;
    wherein in a first configuration the axle is pinned in multiple locations to prevent lateral rotation of the first wheel assembly and the second wheel assembly;
    wherein removal of the axle permits the first wheel assembly and the second wheel assembly to rotate laterally from the first configuration into a folded configuration;
    wherein the axle is attached to the center deck panel in order to lock the first wheel assembly and the second wheel assembly in the folded configuration;
    wherein each side deck panel is attached to the center deck panel or to another side deck panel via a locking mechanism;
    wherein the locking mechanism comprises:
    a pivot rod comprising a shaft;
    a pivot plate comprising a first hole, a second hole, and a third hole;
    a spring; and
    a washer;
    wherein the shaft of the pivot rod is placed through the first hole;
    wherein the washer is welded to a first end of the pivot rod when the spring is compressed;
    wherein there is a continuous load on the spring, so that it is necessary to exert force to remove the pivot rod from the first hole; and wherein a second end of the pivot rod can be rotated and used as a locking pin in the second hole or the third hole.

10. The trailer system of claim 9, wherein the second end of the pivot rod is colored, so that when the pivot rod is not properly engaged the color is visible, and when the pivot rod is properly engaged the color is not visible.

11. The trailer system of claim 1, wherein the center deck panel comprises:
a bracket assembly;
a bracket;
a shackle; and
a leaf spring;
wherein the bracket assembly connects the leaf spring to the center deck panel; and
wherein the bracket is connected to the leaf spring through the shackle.

12. The trailer system of claim 11, further comprising:
a spindle; and
a plate welded to the spindle;
wherein the spindle is connected to the leaf spring; and
wherein the axle is double pinned at two points on the spindle.

* * * * *